(12) United States Patent
Setton et al.

(10) Patent No.: US 9,674,235 B2
(45) Date of Patent: Jun. 6, 2017

(54) CREATING A CONTACT LIST AND PRE-POPULATED USER ACCOUNTS

(71) Applicant: TangoMe, Inc., Mountain View, CA (US)

(72) Inventors: Eric Setton, Menlo Park, CA (US); Gregory Dorso, San Jose, CA (US); Ian Barile, Palo Alto, CA (US); Chen Ding, Mountain View, CA (US)

(73) Assignee: TangoMe, Inc., Mountain View, CA (US)

( * ) Notice: Subject to any disclaimer, the term of this patent is extended or adjusted under 35 U.S.C. 154(b) by 16 days.

(21) Appl. No.: 13/967,170

(22) Filed: Aug. 14, 2013

(65) Prior Publication Data

US 2015/0052206 A1    Feb. 19, 2015

(51) Int. Cl.
*G06F 15/16* (2006.01)
*H04L 29/06* (2006.01)
*H04L 12/58* (2006.01)
*G06Q 50/00* (2012.01)
*G06Q 10/10* (2012.01)

(52) U.S. Cl.
CPC .......... *H04L 65/403* (2013.01); *G06Q 10/10* (2013.01); *G06Q 50/01* (2013.01); *H04L 51/00* (2013.01); *H04L 51/28* (2013.01); *H04L 51/32* (2013.01)

(58) Field of Classification Search
CPC ..................................................... H04L 51/32
USPC ........................................................ 709/206
See application file for complete search history.

(56) References Cited

U.S. PATENT DOCUMENTS

| 8,584,258 | B2 |  | 11/2013 | La Rotonda et al. |
|---|---|---|---|---|
| 8,788,319 | B2 | * | 7/2014 | Carpenter et al. ......... 705/14.26 |
| 2006/0184997 | A1 | * | 8/2006 | La Rotonda et al. ............ 726/2 |
| 2010/0005520 | A1 | * | 1/2010 | Abbot et al. ...................... 726/6 |
| 2010/0057732 | A1 | * | 3/2010 | O'Sullivan et al. .............. 707/6 |
| 2010/0269158 | A1 | * | 10/2010 | Ehler et al. ....................... 726/4 |
| 2010/0299276 | A1 | * | 11/2010 | Shahine et al. ............... 705/319 |
| 2010/0299363 | A1 |  | 11/2010 | Bhattacherjee et al. |
| 2012/0079023 | A1 | * | 3/2012 | Tejada-Gamero et al. ... 709/204 |
| 2012/0197967 | A1 |  | 8/2012 | Sivavakeesar |
| 2012/0209694 | A1 | * | 8/2012 | Kunchakarra et al. .... 705/14.41 |
| 2012/0324009 | A1 |  | 12/2012 | Lee et al. |
| 2013/0073636 | A1 | * | 3/2013 | Zhu et al. ...................... 709/206 |
| 2013/0086185 | A1 | * | 4/2013 | Desmarais et al. ........... 709/206 |
| 2013/0325503 | A1 | * | 12/2013 | Abrahams et al. ............... 705/3 |

OTHER PUBLICATIONS

"PCT/US2014/048514 International Search Report and Written Opinion", Nov. 11, 2014, 8 pages.

* cited by examiner

*Primary Examiner* — Wing F Chan
*Assistant Examiner* — Joseph Maniwang

(57) ABSTRACT

Systems and methods are disclosed for creating a contact list and pre-populated user accounts. An existing contact list associated with a first user is imported at a computer system. A second contact list is created for the first user for a user account associated with a social network service wherein the second contact list comprises members from the existing contact list. Members of the existing contact list whom already have a user account with the social network service are filtered into a first category. Members of the existing contact list whom do not have a user account with the social network service are filtered into a second category. Pre-populated user accounts associated with the social network service are created for the members in the second category.

27 Claims, 4 Drawing Sheets

Process
400

AN EXISTING CONTACT LIST IS ASSOCIATED WITH A FIRST USER IS IMPORTED AT A COMPUTER SYSTEM.
402

PRE-POPULATED ACCOUNTS ASSOCIATED WITH A SOCIAL NETWORK SERVICE ARE CREATED FOR MEMBERS OF THE EXISTING CONTACT LIST WHOM DO NOT HAVE A USER ACCOUNT WITH THE SOCIAL NETWORK SERVICE.
404

A SECOND CONTACT LIST IS CREATED FOR THE FIRST USER FOR A USER ACCOUNT ASSOCIATED WITH THE SOCIAL NETWORK SERVICE WHEREIN THE SECOND CONTACT LIST COMPRISES MEMBERS FROM THE EXISTING CONTACT LIST, AND WHEREIN THE SECOND CONTACT LIST IS TO BE DISPLAYED TO THE FIRST USER WITHOUT DISTINGUISHING BETWEEN MEMBERS WHOM ALREADY HAVE A USER ACCOUNT ASSOCIATED WITH THE SOCIAL NETWORK SERVICE AND MEMBER FOR WHOM A PRE-POPULATED ACCOUNT WAS CREATED.
406

A REQUEST IS FROM THE FIRST USER TO SEND A FIRST COMMUNICATION TO A SECOND USER WHO IS A MEMBER OF THE SECOND CATEGORY.
408

THE FIRST COMMUNICATION IS ASSOCIATED WITH A PRE-POPULATED ACCOUNT FOR THE SECOND USER.
410

AN ALTERNATE COMMUNICATION IS SENT TO THE SECOND USER WHEREIN THE ALTERNATE COMMUNICATION COMPRISES A LINK TO THE FIRST COMMUNICATION.
412

Fig. 4

CREATING A CONTACT LIST AND PRE-POPULATED USER ACCOUNTS

BACKGROUND

Modern technologies allow for various methods and techniques for communicating between two devices. Communications may occur over a network. A social network service may be used for communications between two users. Most social network services require each user to create a user account associated with the social network service in order to user the social network service.

BRIEF DESCRIPTION OF THE DRAWINGS

FIG. 4 illustrates a flowchart of an example method for creating a contact list and pre-populated user accounts and sending communications using pre-populated user accounts in accordance with embodiments of the present technology.

Figure 1:
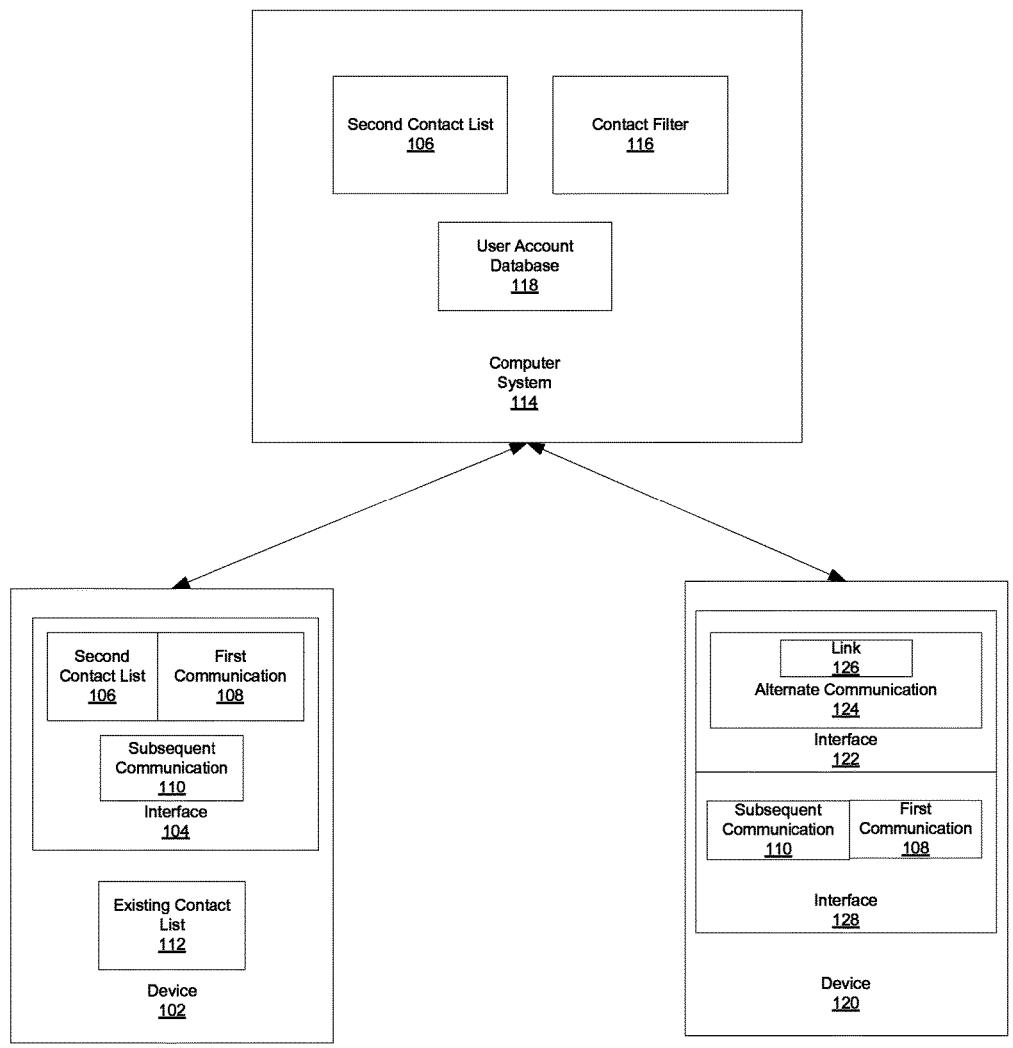
FIG. 1 illustrates a block diagram of an example environment for creating a contact list and pre-populated user accounts in accordance with embodiments of the present technology.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "importing," "creating," "filtering," "sending," "displaying," "receiving," "associating," "displaying," or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Creating a Contact List and Pre-Populated User Accounts

Embodiments of the present technology are for creating a contact list and pre-populated user accounts for use with a social network service. A social network service may allow communications to be sent between two or more users. For example, the users may each have an associated device such as computers, laptops, tablets, smartphones, handheld devices, etc. for use in sending and receiving communications. The social network service may provide methods, techniques, and services for the users to send one another communications such as textual messages, instant messages, pictures, videos, audio calls or conferences, video calls or conferences, animations, or combinations thereof. A series or sequence of communications between a plurality of users may be referred to as a threaded conversation and may employ multiple forms of communications.

A typical social network service may require a user to establish a user account as well as contacts in the form of a contact list or an address book that comprises the names or usernames of other users on the social network service. The social network service may also require software or an app be downloaded and installed to the user's device before communications may be sent and received. These limitations are often barriers for new users to join a social networking service. Therefore, the present technology provides solutions to assist a new user in creating a new user account with a contact list for the social network service and for assisting the new users' friends and contacts in also establishing new user accounts if they do not already have one. In one embodiment, the social network service is Tango.

In one embodiment, a computer system, such as a server, is associated with the social network service which identifies a new user who has created a new user account. The computer system then imports an existing contact list associated with the new user. The computer system then filters the existing contact list to create two categories of members on the existing contact list. The first category comprises members of the existing contact list whom are already associated with social network service. For example the member may already have a username with the social network service. The second category comprises members of the existing contact list that are not currently associated with the social network service. The computer system then creates pre-populated user accounts for some or all of the members in the second category.

A second contact list is created for the new user based on the existing contact list. The second contact list is the contact list or address book that the new user will employ for communicating over the social network service. The second contact list may comprise all of the first category members and some or all of the members of the second category. The second contact list is associated with the new user such that the new user may access the social network service via an interface on a device. The second contact list may be sent to or downloaded by a device associated with the new user. In one embodiment, the second contact list is displayed to the new user such that no distinction is made between members of the contact list in the first and second category. Thus the new user may send communications to members from the first or second category via the social network service.

Overview of Sending Communications Using Pre-Populated User Accounts

Embodiments of the present technology are also for sending communications over a social network service using pre-populated user accounts. The present technology allows a first user to create a user account associated with a social network service and send a communication via the social network service to a second user not associated with the social network service. In one embodiment, the social network service creates a pre-populated user account for the second user. The second user may be referred to as a pre-member of the social network service. The pre-populated user account is then used to send the communication to the second user.

In one embodiment, the second user is first sent an alternate communication that provides the second user with a link to an interface associated with the social network service that will then deliver the communication from the first user to the second user. For example, the alternate communication may be a short message service (SMS) message or an email. The SMS message or email may comprise a uniform resource locator link that when selected or clicked by the second user will open an interface that is associated with the social network service and deliver the communication.

In one embodiment, once the second user selects the link and receives the communication, the second user may then be invited to join the social network service. If the invitation is accepted then the pre-populated user account associated with the second user becomes a full user account. In one embodiment, the pre-populated user account associated with the second user becomes a full user account seamlessly and automatically upon the second user selecting the link. Thus, the present technology may be employed to migrate uses from a first social network service to a second social network service in a way that is seamless and user friendly.

The second user may respond to the communication with a subsequent communication. The subsequent communication may be generated and sent by the second user via the device associated with the second user and the interface associated with the social network service. The first user may then receive the subsequent communication via the social network service. Subsequent communications may also be sent by the second user via the method used for the alternate communication such as SMS messaging or email.

In one embodiment, security techniques are employed to ensure that the second user is the only user authorized to use or access the pre-populated user account. One such measure may be accomplished by fingerprinting the unique characteristics of a browser. For example, once the second user selects the link a first browser associated with the second user's device is employed to navigate to the URL and open the communication. The computer system associated with the social network service then records the unique characteristics of the first browser and only allows the first browser to re-access the link or any subsequent communications associated with the second user's pre-populated user account. Alternatively, this may be accomplished by having the server give a "cookie" to the browser for subsequent authentication. It should be appreciated that the embodiments regarding the creating of a contact list and pre-populated user accounts may be combined with the embodiments of sending communications using pre-populated user accounts.

Methods and Systems for Creating a Contact List and Pre-Populated User Accounts and for Sending Communications Using Pre-Populated User Accounts FIG. 1 depicts environment 100 comprising device 102, computer system 114, and device 120. Computer system 114 may be a server computer system and is controlled by a social network service. Computer system 114 may also refer to more than one computer such as a server farm, cloud computing resources, a peer-to-peer network, etc. Computer system 114 is capable of receiving and forwarding communications from one user device to another user device. The communications may be associated with a user account or a pre-populated user account.

Devices 102 and 120 are each associated with one or more users and may be computers, laptops, tablets, smartphones, handheld devices, etc. for use in sending and receiving communications. The devices may have one or more of the following: screen or display, speakers, microphone, touch-screen, keyboard, mouse, digital cameras, or other input and output components. The devices are capable of generating communications such as a text message, an audio message, an instant message communication, a video message, a gift, an animation, and a video chat.

Device 102 has a copy of or has access to existing contact list 112. Existing contact list 112 may be associated with a different social network service such as an email service or instant messaging service. In one embodiment, the existing contact list is the address book associated with a smartphone such as an iOS device or an Android device. The existing contact list may comprise some or all of the following: names, usernames, phone numbers, physical addresses, email addresses, and other identifying information of people.

Existing contact list 112 may be accessed by computer system 114 and contact filter 116 to create second contact list 106. Contact filter 116 is able to filter the members of existing contact list 112 to determine if they are already associated with the social network service. The filtering may be performed by using identifying information such as name, phone number, email address, etc. and comparing the information to information in user account database 118. Contact filter 116 is also able to determine if a member of existing contact list 112 is not associated with social network service or if the member already has a pre-populated user account.

Computer system 114 creates second contact list 106 from existing contact list 112 based on both the members associated with social network service and the members not associated with the social network service. In one embodiment, second contact list 106 comprises all of the members of existing contact list 112. In one embodiment, second contact list 106 comprises all of the members from existing contact list 112 associated with the social network service (first category) and only a subset of the members from existing contact list 112 not associated with the social network service (second category). The subset of the second category members may be based on a maximum number of pre-populated user account contacts a user is allowed to have in second contact list 106.

In one embodiment, the subset of second category members is created based on an algorithm used to determine if the potential second category member is also a contact of an already existing user of the social network service. For example, the algorithm may have a rule that a potential user to be included in second contact list 106 must also be a potential user for a specified number of other users of the social network such as three other users. It should be appreciated that the purpose of creating a subset of second category members is to show people who are most likely to convert or begin using the social networking service. In one embodiment, the rule used to create the subset of second category members could be "who has the first user sent the most SMS messages to," or a predetermined number of SMS messages sent from the first user to a second user or some other heuristic.

In one embodiment, pre-populated user accounts are created by computer system 114 for the members of the second category that are included second contact list 106. The pre-populated user accounts use the data from existing contact list 112 or from data already in user account database 118 to pre-populate fields of data required for a full user account. The pre-populated user accounts may be assigned temporary user names that may or may not be visible to potential users. Reverse contact look up on the receiver may be employed to determine a mobile phone number for a pre-populated user account. Email addresses may also be employed for the pre-populated user accounts. In one embodiment, the user of device 102 may be prompted for information regarding a potential member for a pre-populated user account. The pre-populated user accounts allow for an account associated with the social network service be created for a user such as the second user without any explicit input from the second user. In one embodiment, the creation of pre-populated accounts for the second category members happens "lazily", i.e. only when the first user decides to interact with them. This "lazily" creation helps minimize undue server load.

Once second contact list 106 is created it may be stored at user account database 118. Second contact list 106 may be subsequently updated or modified. Second contact list 106 may be accessed by device 102 via interface 104. Device 102 may also download a copy of second contact list 106. The user may access or download second contact list 106 from more than one device. In one embodiment, interface 104 displays second contact list 106 to the user of device 102. The display may not show any different between a contact that has a full user account with the social network service versus a contact that only has a pre-populated user account. Thus, the present technology seamlessly adds pre-populated user accounts to second contact list 106 such that the user of device 102 may easily send communications to the second user via the social network service. In one embodiment, interface 104 is a graphical user interface that is associated with the social network service and is used to generate, send and receive messages over the social network service.

In one embodiment, first communication 108 is generated at device 102 and is sent to computer system 114 to be relayed to device 120 where device 120 is associated with a second user for whom a pre-populated user account has been created. First communication 108 may be any type of communication typically associated with the social network service. Computer system 114 then receives first communication 108 and generates alternate communication 124. Alternate communication 124 comprises link 126 which comprises a URL for device 120 to access first communication 108 via a browser or other means. In one embodiment, alternate communication 124 is an SMS message or an email or both are sent with the same URL. The SMS message or email is displayed on device 120 via interface 122 which is not associated with the social network service. For example, if device 120 is a smart phone then interface 122 may be an email app executing on the smart phone. Once the second user selects or clicks on link 126 then the URL directs the browser of device 120 to interface 128 associated with the social network service to access first communication 108. In one embodiment, interface 128 is a webpage that simulates the interface of the social network service that may be used via an app downloaded to a smartphone.

The second user may then generate a response to first communication 108 such as subsequent communication 110. It should be appreciated that first communication 108 and subsequent communication 110 may be different types of communications from one another and may be part of a larger threaded conversation stream involving multiple parties and devices. In one embodiment, first communication 108 may be a type of communication that requires the second user to activate, open, or establish a full user account with the social network service. For example, video chats or conferences, audio calls, or group chats may require a full user account. Both first communication 108 and alternate communication 124 may be time stamped.

In one embodiment, when the second user opens the webpage for first communication 108, the webpage will be responsive to the type of browser and device being used. For example, a mobile device using a mobile browser may employ content that is not as feature rich as a browser executing on a desktop computer system.

A browser associated with device 120 may open the URL associated with link 126. The browser may then be the only browser allowed to open communications associated with the pre-populated user account for the second user. This limiting to the first browser is a security technique designed to prevent malicious users from taking advantage of the pre-populated user accounts. This security measure may be accomplished by fingerprinting the unique characteristics of a browser. The security measure may also be accomplished by having the server give a "cookie" to the browser for subsequent authentication. If computer system 114 or the social network service determines that a pre-populated user account has been hacked or is being used by someone other than the intended user, than the account may be disabled. In one embodiment, the second user can re-claim authentication token by initiating an SMS verification through the mobile browser.

Operations

Figure 2:
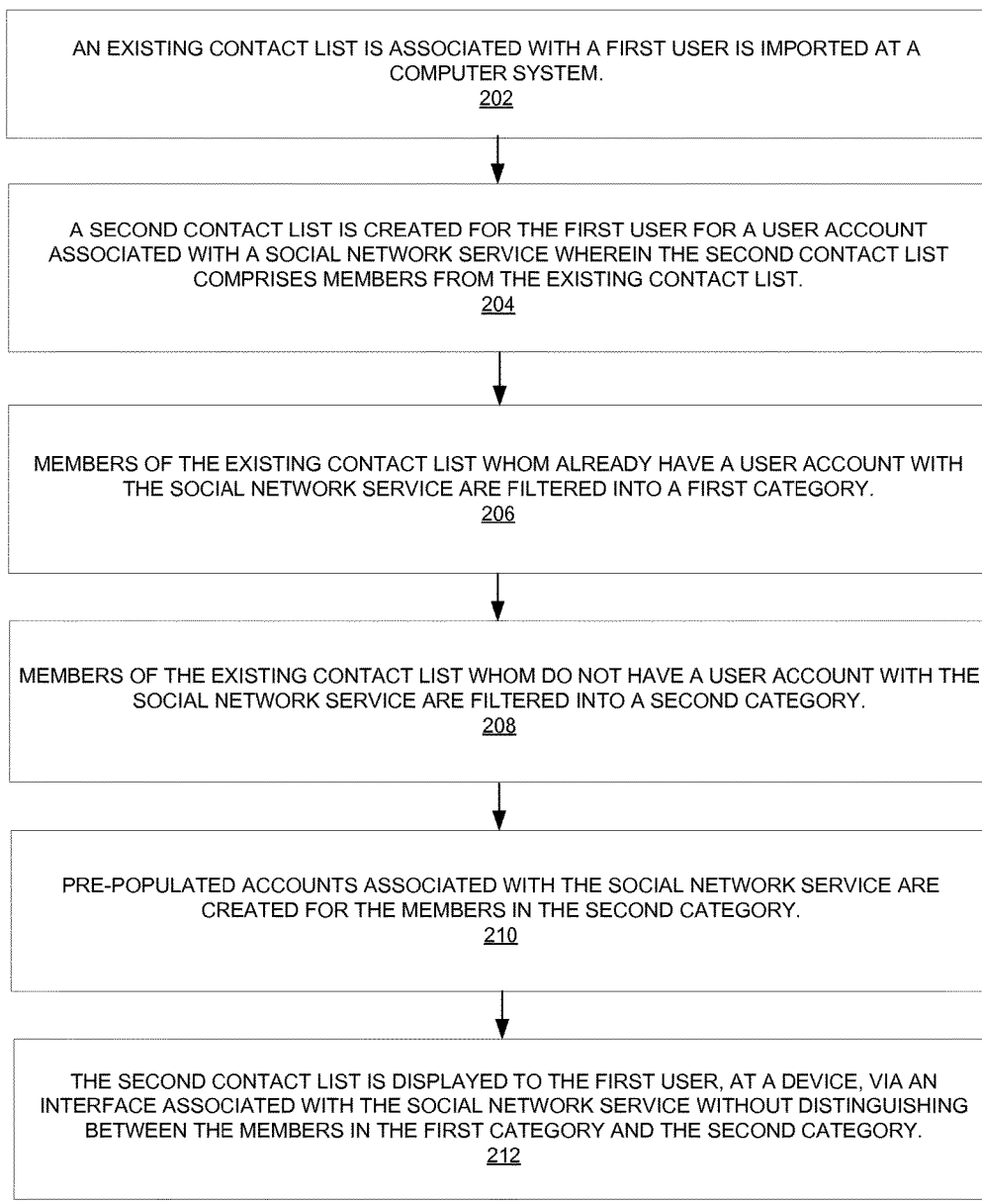
FIG. 2 illustrates a flowchart of an example method for creating a contact list and pre-populated user accounts in accordance with embodiments of the present technology.

FIG. 2 is a flowchart illustrating process 200 for creating a contact list and pre-populated user accounts in accordance with one embodiment of the present technology. In one embodiment, process 200 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 200 is performed by the components of FIG. 1.

At 202, an existing contact list associated with a first user is imported at a computer system. For example, existing contact list 112 and computer system 114 may be employed.

At 204, a second contact list is created for the first user for a user account associated with a social network service wherein the second contact list comprises members from the existing contact list. For example, second contact list 106 may be employed.

At 206, members of the existing contact list whom already have a user account with the social network service are filtered into a first category.

At 208, members of the existing contact list whom do not have a user account with the social network service are filtered into a second category. In one embodiment, contact filter 116 is employed for steps 206 and 208.

At 210, pre-populated accounts associated with the social network service are created for the members in the second category. In one embodiment, the creation of pre-populated accounts for the second category members happens "lazily", i.e. only when the first user decides to interact with them. For example, the interaction may be step 304 of FIG. 3. This "lazily" creation helps minimize undue server load.

At 212, the second contact list is displayed to the first user, at a device, via an interface associated with the social network service without distinguishing between the members in the first category and the second category. The interface may be interface 104.

Figure 3:
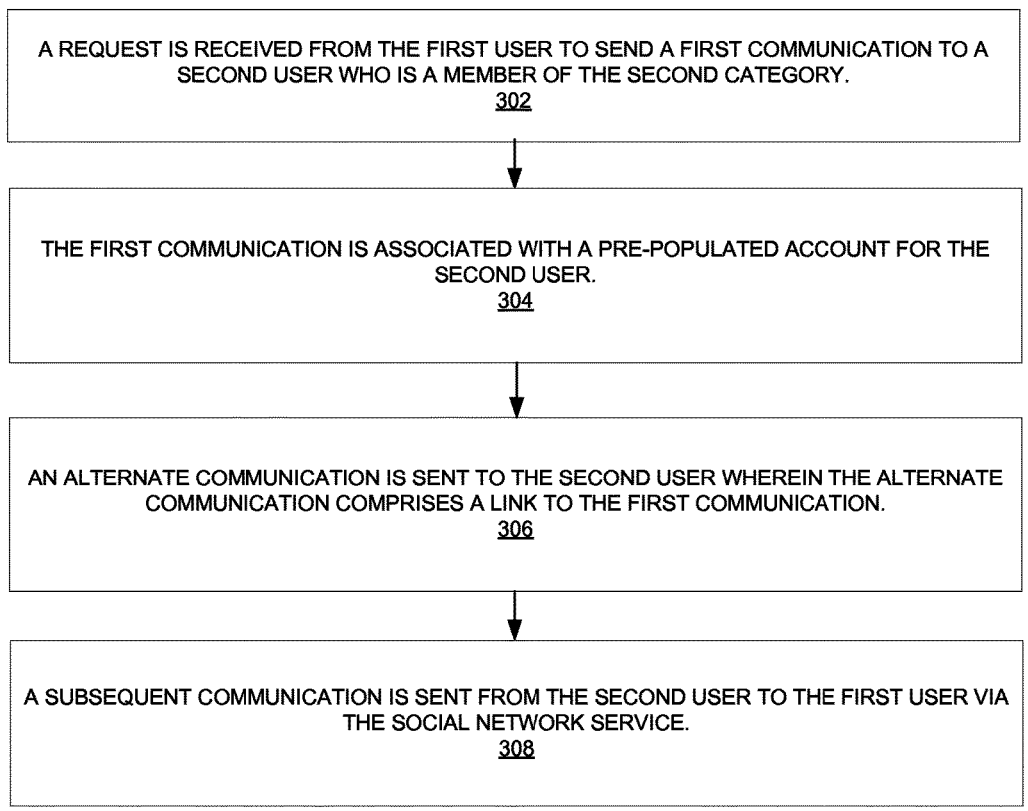
FIG. 3 illustrates a flowchart of an example method for sending communications using pre-populated user accounts in accordance with embodiments of the present technology.

FIG. 3 is a flowchart illustrating process 300 for sending communications using pre-populated user accounts in accordance with embodiments of the present technology. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 300 is performed by the components of FIG. 1.

At 302, a request is received from the first user to send a first communication to a second user who is a member of the second category. The first communication may be a text message, an audio message, an instant message communication, a video message, a gift, an animation, and a video chat.

At 304, the first communication is associated with a pre-populated account for the second user.

At 306, an alternate communication is sent to the second user wherein the alternate communication comprises a link to the first communication. The link may be link 126. The alternate communication may be alternate communication 124 and may be an SMS message, an email, or both.

At 308, a subsequent communication is sent from the second user to the first user via the social network service. The subsequent communication may be subsequent communication 110.

Once the second device or user has accessed the first communication or sent a subsequent communication, then the second user may be prompted to create a full user account to replace the pre-populated user account. Upon accepting the invitation, the second user may then be prompted for more information such as the creation of a password or for access to an existing contact list associated with the second user. The second user may also be prompted to download an app or software associated with the social network service. In one embodiment, once the second user access or responds to a communication, a full user account may be automatically and seamlessly created.

FIG. 4 is a flowchart illustrating process 400 for creating a contact list and pre-populated user accounts and sending communications using pre-populated user accounts in accordance with embodiments of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 400 is performed by the components of FIG. 1.

At 402, an existing contact list is associated with a first user is imported at a computer system. This may be existing contact list 112 and computer system 114.

At 404, pre-populated accounts associated with a social network service are created for members of the existing contact list whom do not have a user account with the social network service.

At 406, a second contact list is created for the first user for a user account associated with the social network service wherein the second contact list comprises members from the existing contact list, and wherein the second contact list is to be displayed to the first user without distinguishing between members whom already have a user account associated with the social network service and member for whom a pre-populated account was created. The second contact list may be second contact list 106.

At 408, a request is from the first user to send a first communication to a second user who is a member of the second category. This may be first communication 108.

At 410, the first communication is associated with a pre-populated account for the second user.

At 412, an alternate communication is sent to the second user wherein the alternate communication comprises a link to the first communication. This may be alternate communication 124 and link 126.

Various embodiments are thus described. While particular embodiments have been described, it should be appreciated that the embodiments should not be construed as limited by such description, but rather construed according to the following claims.

Example Computer System Environment

Portions of the present technology are composed of computer-readable and computer-executable instructions that reside, for example, in computer-usable media of a computer system or other user device such as a smart phone used for mixed media communication. Described below is an example computer system or components that may be used for or in conjunction with aspects of the present technology.

It is appreciated that that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims. It should be appreciated that processes 200, 300 and 400 may be combined various way utilizing some or part of the steps of each process.

The invention claimed is:

1. A method for creating a contact list and pre-populated user accounts, said method comprising:
   importing, at a computer system, an existing contact list associated with a first user;
   creating, at said computer system, a second contact list for said first user for a user account associated with a social network service wherein said second contact list comprises members from said existing contact list;
   filtering, at said computer system, members of said existing contact list whom already have a user account with said social network service into a first category;
   filtering, at said computer system, members of said existing contact list whom do not have a user account with said social network service into a second category; and
   automatically creating, at said computer system prior to communication within said social network service and based on said existing contact list and said second contact list, pre-populated user accounts associated with said social network service for said members in said second category without input from said members in said second category such that said pre-populated user accounts are employed by said first user to contact said members via said social network service, wherein said pre-populated user accounts are created before said first user employs attempts to contact said members via said social network service and said pre-populated accounts may be used by said members in said second category to respond to said contact from said first user.

2. The method as recited in claim 1 further comprising:
   displaying said second contact list to said first user, at a device, via an interface associated with said social network service without distinguishing between said members in said first category and said second category.

3. The method as recited in claim 1 further comprising:
   receiving a request from said first user to send a first communication to a second user who is a member of said second category;
   associating said first communication with a pre-populated user account for said second user; and
   sending an alternate communication to said second user wherein said alternate communication comprises a link to said first communication.

4. The method as recited in claim 3 wherein upon a selection of said link to said first communication, said link delivers said first communication to said second user via an interface and communications means associated with said social network service.

5. The method as recited in claim 3 wherein a reply generated by said second user is associated with said pre-populated user account for said second user and is sent to said first user via said social network service.

6. The method as recited in claim 3 wherein said alternate communication is an email.

7. The method as recited in claim 3 wherein said alternate communication is a text message.

8. The method as recited in claim 3 wherein said first communication is selected from the group of communications consisting of: a text message, an audio message, an instant message communication, a video message, a gift, an animation, and a video chat.

9. The method as recited in claim 3 wherein a first browser to access said link is associated with said pre-populated user account for said second user and only said first browser is allowed to access subsequent communications related to said second user for security purposes.

10. The method as recited in claim 1 wherein said second contact list comprises all members from said existing contact list.

11. The method of claim 1 wherein said second contact list comprises members of said first category and members of said second category who are associated with more than one user already associated with said social network service.

12. The method of claim 1 wherein said second contact list comprises members of said second category whom said first user has sent a predetermined number of SMS messages to.

13. The method of claim 1 wherein said second contact list comprises members of said first category and members of said second category limited to a maximum number of contacts for said second contact list.

14. A non-transitory computer-usable storage medium having instructions embodied therein that when executed cause a computer system to perform a method for creating a contact list and pre-populated user accounts, said method comprising:
   importing, at a computer system, an existing contact list associated with a first user;

creating, at said computer system, a second contact list for said first user for a user account associated with a social network service wherein said second contact list comprises members from said existing contact list;

filtering, at said computer system, members of said existing contact list whom already have a user account with said social network service into a first category;

filtering, at said computer system, members of said existing contact list whom do not have a user account with said social network service into a second category; and automatically creating, at said computer system prior to communication within said social network service and based on said existing contact list and said second contact list, a pre-populated user account associated with said social network service for a member in said second category without input from said member in said second category such that said pre-populated user account is employed by said first user to contact said member via said social network service, wherein said pre-populated user account is only created if said member in said second category is also a potential member for at least one other existing user of said social network service.

15. The non-transitory computer-usable storage medium as recited in claim 14 further comprising:

displaying said second contact list to said first user, at a device, via an interface associated with said social network service without distinguishing between said members in said first category and said second category.

16. The non-transitory computer-usable storage medium as recited in claim 14 further comprising:

receiving a request from said first user to send a first communication to a second user who is a member of said second category;

associating said first communication with a pre-populated user account for said second user; and sending an alternate communication to said second user wherein said alternate communication comprises a link to said first communication.

17. The non-transitory computer-usable storage medium as recited in claim 16 wherein upon a selection of said link to said first communication, said link delivers said first communication to said second user via an interface and communications means associated with said social network service.

18. The non-transitory computer-usable storage medium as recited in claim 16 wherein a reply generated by said second user is associated with said pre-populated user account for said second user and is sent to said first user via said social network service.

19. The non-transitory computer-usable storage medium as recited in claim 16 wherein said alternate communication is an email.

20. The non-transitory computer-usable storage medium as recited in claim 16 wherein said alternate communication is a text message.

21. The non-transitory computer-usable storage medium as recited in claim 16 wherein said first communication is selected from the group of communications consisting of: a text message, an audio message, an instant message communication, a video message, a gift, an animation, and a video chat.

22. The non-transitory computer-usable storage medium as recited in claim 16 wherein a first browser to access said link is associated with said pre-populated user account for said second user and only said first browser is allowed to access subsequent communications related to said second user for security purposes.

23. The non-transitory computer-usable storage medium as recited in claim 14 wherein said second contact list comprises all members from said existing contact list.

24. The non-transitory computer-usable storage medium of claim 14 wherein said second contact list comprises members of said first category and members of said second category who are associated with more than one user already associated with said social network service.

25. The non-transitory computer-usable storage medium of claim 14 wherein said second contact list comprises members of said second category whom said first user has sent a predetermined number of SMS messages to.

26. The non-transitory computer-usable storage medium of claim 14 wherein said second contact list comprises members of said first category and members of said second category limited to a maximum number of contacts for said second contact list.

27. A method for creating a contact list and pre-populated user accounts, said method comprising:

importing, at a computer system, an existing contact list associated with a first user;

creating, at said computer system, pre-populated user accounts associated with a social network service for members of said existing contact list whom do not have a user account with said social network service;

creating, at said computer system, a second contact list for said first user for a user account associated with said social network service wherein said second contact list comprises members from said existing contact list, and wherein said second contact list is to be displayed to said first user without distinguishing between members whom already have a user account associated with said social network service and members for whom a pre-populated user account was created;

receiving a request from said first user to send a first communication to a second user who is a member of said second contact list;

associating said first communication with a pre-populated user account automatically created for said second user prior to communication within said social network service and based on said existing contact list and said second contact list wherein said pre-populated user account is created without input from said second user and was created before said receiving said request and said pre-populated account may be used by said second user to respond to said first communication; and sending an alternate communication to said second user wherein said alternate communication comprises a link to said first communication.

* * * * *